J. J., A. J. AND G. H. BRUNGARDT AND H. J. DREILING.
FEEDER FOR ATTACHMENT TO THRESHING MACHINES.
APPLICATION FILED APR. 5, 1919.
1,364,703.
Patented Jan. 4, 1921.
2 SHEETS—SHEET 1.
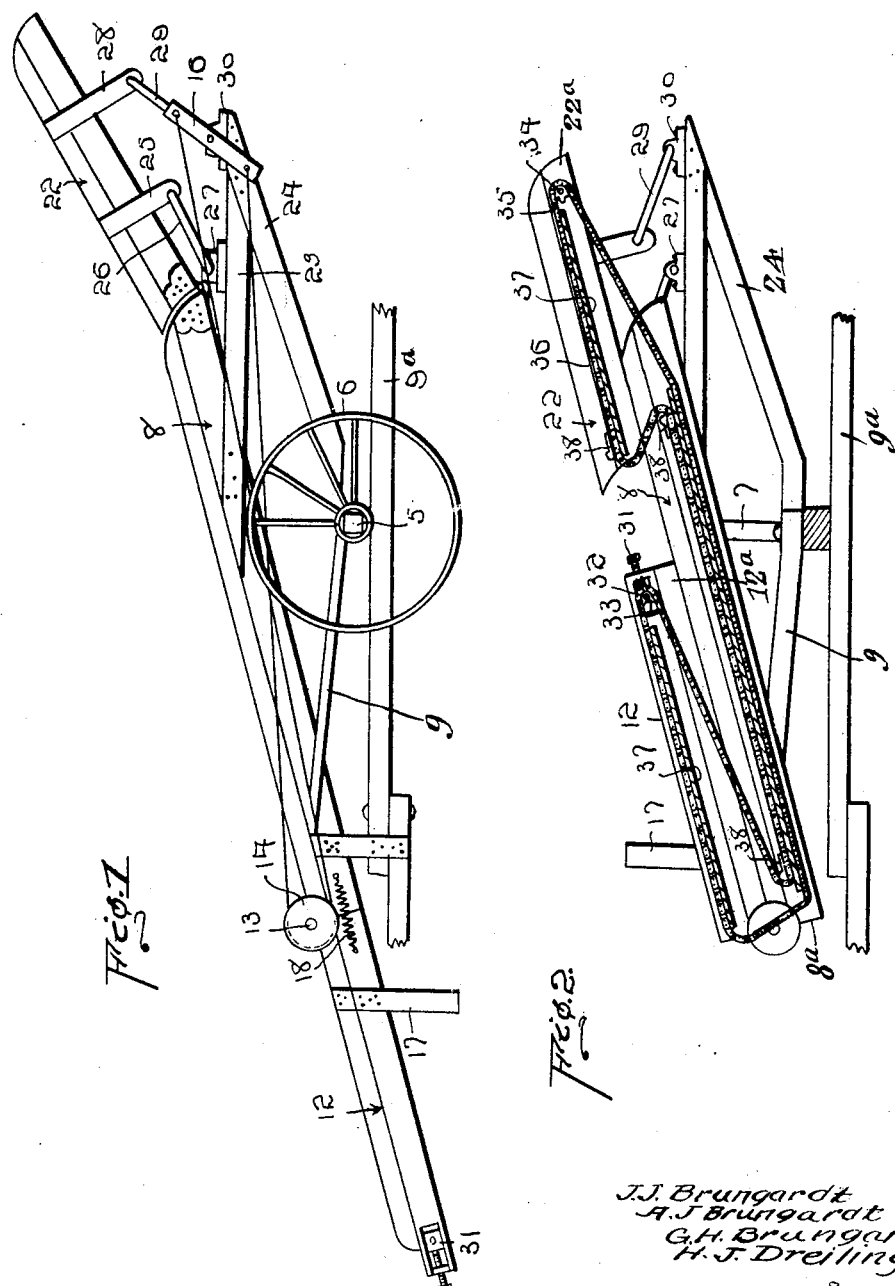

J. J., A. J. AND G. H. BRUNGARDT AND H. J. DREILING.
FEEDER FOR ATTACHMENT TO THRESHING MACHINES.
APPLICATION FILED APR. 5, 1919.
1,364,703.
Patented Jan. 4, 1921.
2 SHEETS—SHEET 2.
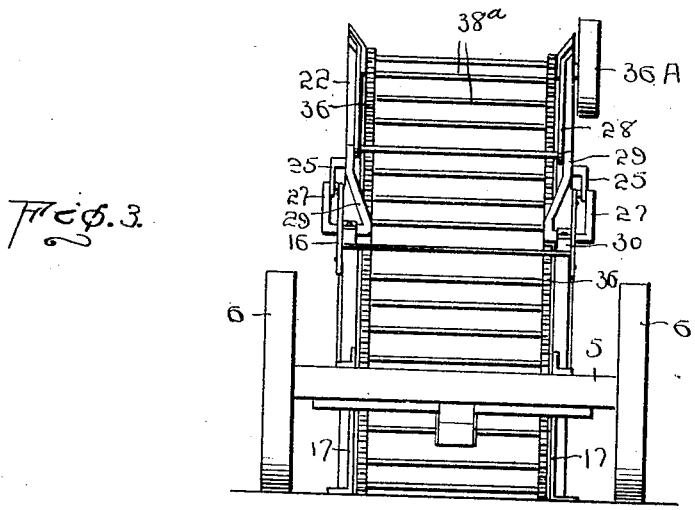
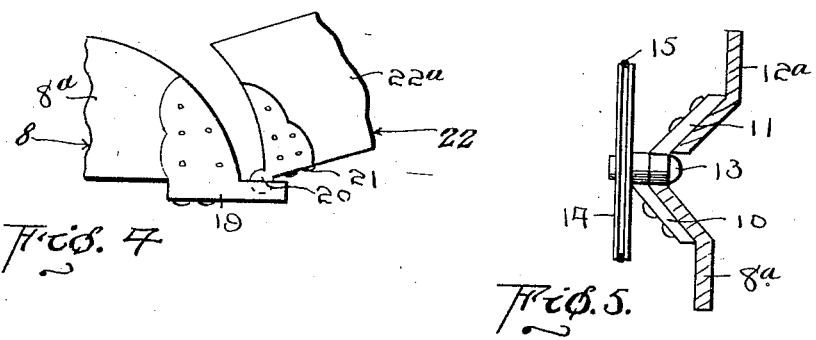
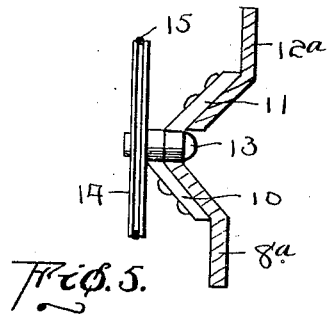
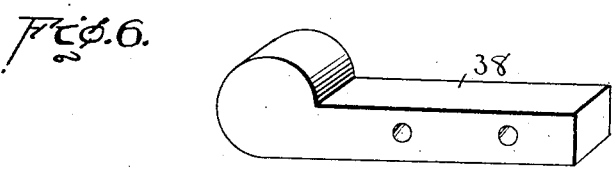
J. J. Brungardt
A. J. Brungardt
G. H. Brungardt
H. J. Dreiling
Inventors
By Geo. P. Kimmel
Attorney

UNITED STATES PATENT OFFICE.

JOHN J. BRUNGARDT, ADOLF J. BRUNGARDT, GUIDO H. BRUNGARDT, AND HERMAN J. DREILING, OF VICTORIA, KANSAS.

FEEDER FOR ATTACHMENT TO THRESHING-MACHINES.

1,364,703. Specification of Letters Patent. Patented Jan. 4, 1921.

Application filed April 5, 1919. Serial No. 287,704.

*To all whom it may concern:*

Be it known that we, JOHN J. BRUNGARDT, ADOLF J. BRUNGARDT, GUIDO H. BRUNGARDT, and HERMAN J. DREILING, citizens of the United States, residing at Victoria, in the county of Ellis and State of Kansas, have invented certain new and useful Improvements in Feeders for Attachment to Threshing-Machines, of which the following is a specification.

This invention relates to improvement of extension feeders for attachment to threshing machines and has for its object an improved wheel supported feeder which may be attached to and propelled by the threshing machine.

Another object of the invention is the provision of a feeder embodying such novel features of construction as to permit it to be compactly folded when not in use in order to economize in the space required to store the device.

With these and other objects in view as will appear as the description proceeds the invention comprises the novel features of construction, accompanied by elements and arrangement of parts which will be more fully described in the following specification and set forth with particularity in the claims appended hereto.

Figure 1 represents a side elevation of the improved feeder,

Fig. 2 represents a longitudinal sectional view thereof showing the sections in folded position, Fig. 3 represents a rear elevation of the feeder, Fig. 4 represents a detail sectional view through the joint between the upper and center sections, Fig. 5 represents a detail view through the joint of the middle and lower sections, and Fig. 6 represents a perspective view of one of the chain guides removed.

Referring to the drawing in detail wherein similar reference characters designate corresponding parts throughout the several views, the numeral 5 indicates an axle supported upon wheels 6 whereby the conveyer may be conveniently transported along with the threshing machine in connection with which it is used. The axle supports vertical uprights 7 connected with the relatively stationary center section 8 which is further braced by the inclined brace rods 9 extending from one end of the section to the axle 5. A suitable type of draft tongue 9ᵃ is preferably attached to the axle 5.

The front terminals of the spaced side walls 8ᵃ of the inclined center conveyer section 8 are provided with apertured brackets 10 which are engaged with similar brackets 11 carried by the spaced side walls 12ᵃ of the inclined front conveyer section 12 whereby the front and center sections are pivotally connected and capable of being folded together. A pivot pin 13 is rotatably mounted in the brackets 10 of the center section and is rigidly secured against rotation in the brackets of the front section 12 whereby rotary movement of the pins is transmitted to the front section to throw the latter to the position shown in Fig. 2. A grooved pulley 14 is rigidly secured to the pin 13 at each side of the conveyer and supports a cable 15 which is rigidly secured in the groove of the pulley and has its forwardly extended portions crossed and connected with a lever 16. The front section 12 is supported in operative inclined position by legs 17 and the adjacent portions of the center and front sections are connected by a spring 18 having its terminals connected with the respective sections at a point below the pivotal axis between the sections whereby the latter are retained in adjusted position.

The upper or rear end of the center section is provided with recess plates 19 receiving the enlargements or knobs 20 carried by plates 21 secured to the front terminal of the rear section 22, and, as will be understood, the enlargements are removable bodily from the recess plates 19 to permit the rear section to be moved to a position above the rear end of the center section, as suggested in Fig. 2.

The side walls 8ᵃ are connected with rearwardly extended and horizontally disposed beams 23 having connection at their rear ends with the forwardly and downwardly directed bracing members 24 which are connected at their opposite terminals with the axle 5. The front portion of the rear section 22 is provided with depending arms 25 connected with links 26 pivotally supported in bearings 27 attached to the beams 23 and, when the rear section is disposed in operative position the links 26 extend upwardly and rearwardly from the bearing members 27 in such position that a forward push exerted upon the rear section causes the latter to move upwardly above the rear terminal of the center section 8. The rear portion of the rear section is provided with depending arms 28 of greater length than the arms 25 and having connection with a substantially U-shaped member 29 the terminals of which are directed latterly and are supported in bearing members 30 secured upon the extreme rear ends of the beams 23. The levers 16 are rigidly secured upon the angular terminals of the U-shaped member 29 and, having connection with the terminals of the cable 15 transmit movement of the latter to the U-shaped member and rear conveyer section during adjustment of the front section. Each conveyer section includes a pair of spaced side walls having outwardly directed upper edges as shown in Fig. 3 and the lower section or front section is provided in its extreme forward end with adjustable bearings 31 in which is supported a shaft 32 carrying sprocket wheels 33. A shaft 34 is journaled in the extreme rear end of the rear section and is provided with sprocket wheels 35 and conveyer chains 36 located adjacently the inner surface of each side member of the conductor and is extended over the socket wheels 33 and 35. A pulley 36ª is secured to the upper shaft 34 and is adapted to receive a belt or other power transmitting device whereby the conveyer may be driven from an external source of power. The side members of the terminal conveyer sections are connected by a floor or bottom 37 over which the material is conveyed by the strips 38ª connecting the chains 36.

In use the feeder is suitably attached to the threshing machine and is operated by a belt trained over the pulley 36^A causing the chains 38 to travel about the bottom or floor 37 and conveying material deposited in the lower portion of the conveyer to the top thereof. When not in use, the lower section 12 is swung upwardly over the center section 8 upon the pivot pins 13 until it occupies the position illustrated in Fig. 2 and the swinging movement of the front section is transmitted to the pulleys 14 which actuate the cables 15 and levers 16, thus rocking the U-shaped member 29 and causing the rear or upward section 22 to move upwardly and rearwardly to the position shown in Fig. 2, the movement of the front terminal of the rear section being guided by the links 36.

A pair of chain guides 38 is secured to the inner surface of each side member of the center section 8 adjacent the opposite ends of the floor section 37, as suggested in Fig. 2 whereby the chain is held in position and prevented from becoming disarranged when the sections are folded and similar chain guides 38 are secured over the lower end of the floor section of the rear section 22 for a similar purpose.

What we claim is:

1. A feeder including a wheel supported frame structure, a center section supported therein, a rear section, a series of links movably supporting the rear section in substantial alinement with the center section and foldable thereover, a pivoted front section, supporting means therefor, a lever connected with the movable rear section, and means connecting the lever with the pivoted front section whereby the movable sections are simultaneously actuated.

2. A feeder including a wheel mounted frame structure, a center section supported therein, a rear section, means movably supporting said rear section, a front section hingedly connected with the center section, and means connecting the hinge of the front section with the rear section whereby the latter is actuated simultaneously with the front section.

3. A feeder including a frame structure, a center section supported therein, a rear section movably supported upon the frame structure, a series of links movably supporting the rear section in substantial alinement with the center section and foldable thereover, a front section hingedly connected with the center section, a lever connected with the rear section, and means connecting the hinge of the front section with said lever whereby the rear section is actuated simultaneously with the front section.

4. A feeder including a frame structure, a center section supported therein, a rear section movably supported in the frame structure, a front section hingedly connected with the center section, a lever connected with the rear section, a pulley operated by the hinge of the front section, and means connecting said pulley with said lever whereby the rear section is actuated simultaneously with the front section.

In testimony whereof, we affix our signatures hereto.

JOHN J. BRUNGARDT.
ADOLF J. BRUNGARDT.
GUIDO H. BRUNGARDT.
HERMAN J. DREILING.